March 9, 1954 — A. L. HIGBIE — 2,671,407
SEAL CONSTRUCTION FOR MOVABLE PARTS
Filed Feb. 21, 1948 — 2 Sheets-Sheet 1

INVENTOR.
Alan L. Higbie.
BY
Harness and Harris
ATTORNEYS

March 9, 1954  A. L. HIGBIE  2,671,407
SEAL CONSTRUCTION FOR MOVABLE PARTS
Filed Feb. 21, 1948  2 Sheets-Sheet 2
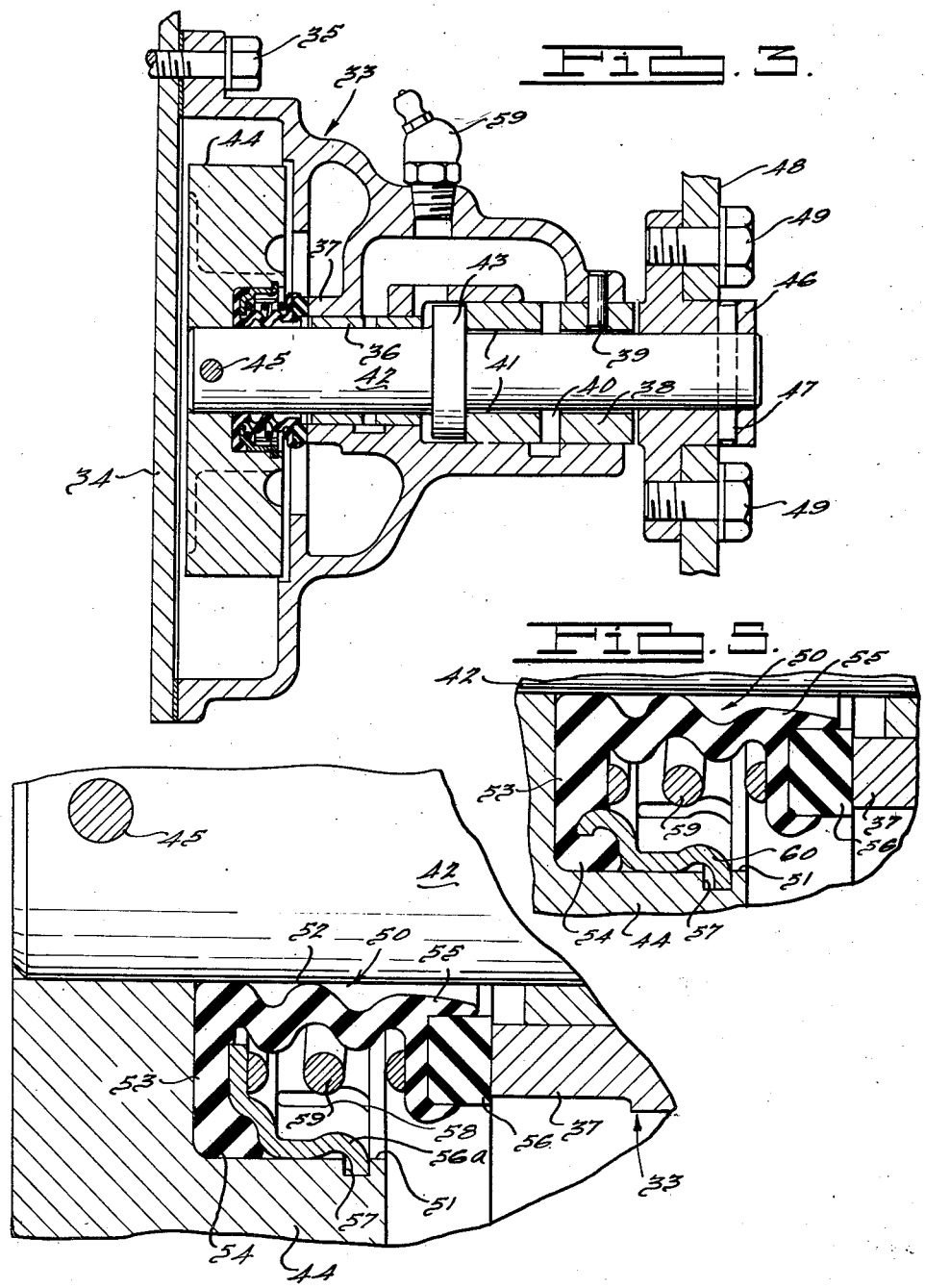
INVENTOR.
Alan L. Higbie.
BY
Harness and Harris
ATTORNEYS.

Patented Mar. 9, 1954

2,671,407

UNITED STATES PATENT OFFICE 2,671,407

SEAL CONSTRUCTION FOR MOVABLE PARTS

Alan L. Higbie, Walled Lake, Mich., assignor to Chrysler Corporation, Highland Park, Mich., a corporation of Delaware Application February 21, 1948, Serial No. 10,075

3 Claims. (Cl. 103—111)

This application relates to a seal construction. More specifically, it relates to a seal between relatively moving parts.

Seals are employed between relatively moving parts to prevent escape of lubricant from the parts or of fluid handled by the parts. It is desirable to keep the leak paths at a minimum, and I have invented an arrangement of seal and relatively moving parts by which this is accomplished. It is important that the sealing arrangement be such that the pressures of the fluid handled or of the lubricant will not cause the leak paths to be opened up. This also is accomplished by the sealing arrangement of the present invention.

In the drawings:

Fig. 3 is a sectional view showing a modified sealing arrangement of my invention applied to a pump;

Fig. 4 is an enlarged sectional view of a portion of the structure of Fig. 3; and Fig. 5 is an enlarged sectional view showing a second modification of my invention.

Figure 1:
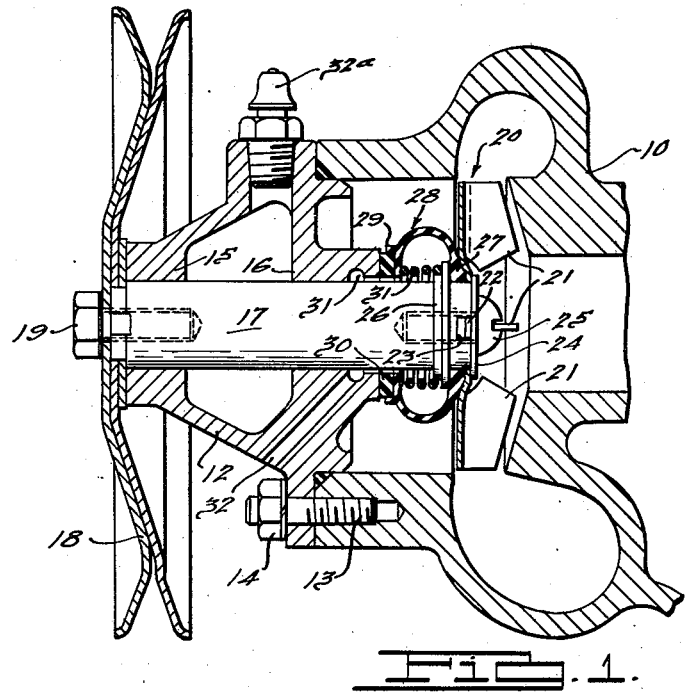
Fig. 1 is a sectional view showing the application of my novel sealing arrangement to a pump.
Figure 2:
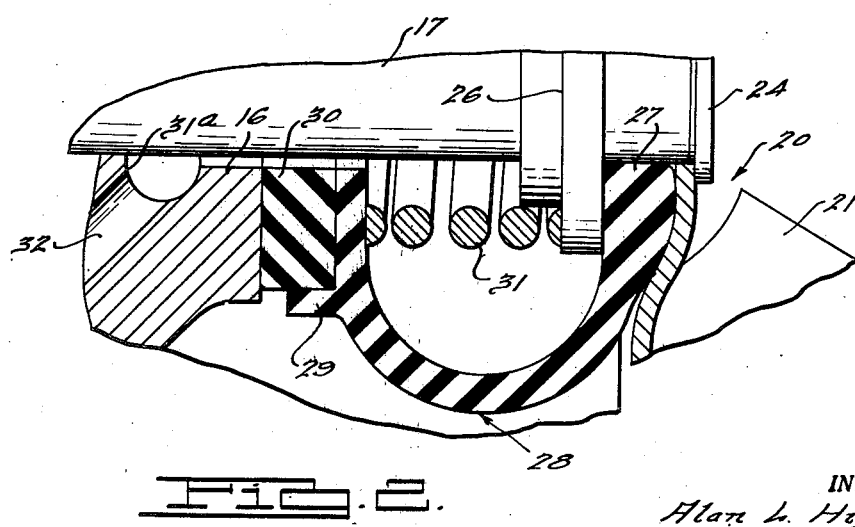
Fig. 2 is an enlarged sectional view of a portion of the structure of Fig. 1.

The reference character 10 designates a pump housing to which an end member 12 is attached by screws 13 and nuts 14. The end member has spaced bearing portions 15 and 16, which support a rotating shaft 17. A pulley 18 is attached to one end of the shaft 17 by a screw 19. At the other end of the shaft 17 is a pump impeller 20 having a plurality of blades 21. The impeller 20 is formed with a central opening receiving one end of the shaft 17. Tongues 22 projecting inwardly forward one another from opposite sides of the opening in a groove of the central opening, lie in a groove 23 formed in the end of the shaft 17 and serve to key the impeller to the shaft. A washer 24 and a screw 25 threaded in the end of the shaft serve to retain the impeller 20 upon the shaft.

Adjacent the impeller end of the shaft 17 is a stepped shoulder 26. The shoulder 26 may be formed as an integral part of the shaft 17 or as a separate part. A thickened end 27 formed on a seal 28 is clamped between the impeller 20 and the shoulder 26. The seal 28 may be formed of a suitable resilient material such as rubber and is shaped as an outwardly convex annulus. One end of the seal 28 is formed in a compound flange 29 within which is bonded a hard ring 30 suitable for sliding sealing engagement with the bearing portion 16 of the end member 12. The ring 30 may be of any suitable material such as a phenolic resin. A coil spring 31 is positioned within the seal 28 and around the shaft 17 and acts between the shoulder 26 and the flanged end 29 on the seal 28 to maintain the ring 30 in contact with the bearing portion 16. As previously stated, the enlarged end 27 of the seal 28 is clamped between the impeller 20 and the shoulder 26. This clamping action is entirely independent of the spring 31.

It will be observed that in the present construction the the leak paths for fluid handled by the impeller 20 have been reduced to one. This path is between the bearing portion 16 and the hard sealing ring 30 at the one end of the seal 28. There is no leak path at the flanged end 27, for this end of the seal is firmly clamped between the shoulder 26 and the impeller 20 entirely independently of the coil spring 31. Any fluid that finds its way into the annular seal 28 by way of the path between the ring 30 and the bearing portion 16 may escape by way of the annular groove 31ª and passage 32 formed in the bearing portion 16 of the end member 12. Lubricant is supplied to the shaft 17 and the bearing portions 15 and 16 of the end member 12 by means of a fitting 32ª.

The shape of the seal 28 is such that variation in hydraulic pressure exerted externally on the seal will not produce a variation in the pressure of the sealing ring 30 on the bearing portion 16. This is due to the fact that any change in pressure is exerted as much in one axial direction to one side of a mid transverse plane of the seal as it is in the other axial direction to the other side of the transverse plane.

Figs. 3 and 4 show a modified form of the seal of the present invention. To a pump housing 33 is secured a cover plate 34 by screws 35. A bearing sleeve 36 is press-fitted within a sleeve portion 37 of the pump housing 33. A bearing sleeve 38, which may be formed of a suitable material such as oillite is secured by a pin 39 in axial alignment with the sleeve 36. The sleeve 38 has openings 40 and slots 41 for lubricant. A rotating shaft 42 is journalled in the sleeves 36 and 38 and carries a separately or integrally formed collar 43. A pump impeller 44 is secured to one end of the shaft 42 by means of a pin 45. A hub member 46 is secured to the other end of the shaft 42 by a pin 47, and a driving pulley 48 is secured by screws 49 to the hub member 46.

A seal 50 of annular form surrounds the shaft 42 and extends into a recess 51 formed in the pump impeller 44. The seal 50 has a body portion 52 of corrugated shape, one end formed as an outwardly extending flange 53 enlarged at its outer end, as indicated at 54, and the other end formed as a compound flange 55 within which is bonded a relatively hard ring 56. This ring may be formed of a suitable material such as a phenolic resin so as to be suited for sliding sealing engagement with the end of the sleeve portion 37 of the pump housing 33. The flange 53 on the annular seal 50 is clamped against the pump impeller 44 by means of a retainer 56ᵃ having one end snapped into an annular groove 57 formed in the recess 51 in the impeller 44. The retainer 56 has a plurality of slots 58, only one of which is to be seen in Fig. 4. A coil spring 59 surrounds the body portion 52 of the engine seal 50 and acts between the retainer 56ᵃ and the compound end flange 55 on the seal 50 to urge the sealing ring 56 against the sleeve portion 37 of the pump housing 33. There is only one leak path for fluid handled by the pump impeller 44 and that lies between the sealing ring 56 and the sealing portion 37. There is no leak path at the end of the seal 50 opposite that at which the sealing ring 56 is attached, because the end flange 53 on the seal 50 if firmly clamped against the pump impeller 44 by the retainer 56ᵃ. This clamping is entirely independent of any action by the coil spring 59, which serves only to urge the sealing ring 56 against the sleeve portion 37.

Suitable lubricant may be supplied to the bearing sleeves 36 and 38 in the pump housing 33 by way of the fitting 59. Movement of the shaft 42 to the right is limited by engagement of the shoulder 43 with the left end of the bearing sleeve 38. Movement of the shaft 42 to the left is limited by engagement of the hub member 46 with the right end of the bearing sleeve 38.

Fig. 5 shows a modification that bears some similarity to that of Figs. 3 and 4 but differs in that a snap-in member 60 does not extend radially inwards sufficiently to be engaged by the coil spring 59. The snap-in member 60 has an outer edge lodged in the groove 57 in the recess 51 in the pump impeller 44 and clamps the enlarged portion 54 of the seal flange 53 against the impeller 44. Thus not only is the clamping action of the snap-in member 57 on the seal flange 53, but also the snap-in member is completely free of the coil spring in that there is no contact between them.

I claim:

1. In combination, a housing, a shaft projecting into the housing, an annulus surrounding the shaft and having ends spaced from one another axially of the shaft, an impeller secured to an end of the shaft in the housing, means carried by the impeller clamping one end of the annulus against the impeller in sealing engagement therewith, and a spring surrounding the annulus and engaged between the clamping means and the other end of the annulus and urging the said other end of the annulus against the housing in sliding sealing engagement therewith.

2. In combination, a housing, a shaft projecting into the housing, an impeller secured to an end of the shaft in the housing and having a portion spaced outwardly and being shaped so as to form with the shaft an annular recess surrounding the shaft, an annulus with axially spaced ends surrounding the shaft and extending into the recess, a member retained by the impeller within the recess and clamping an end of the annulus in the direction of the axis of rotation of said shaft to the impeller within the recess in sealing engagement with the impeller, and a spring surrounding the annulus and acting between the member and the other end of the annulus to urge the said other end of the annulus against the housing in sealing engagement therewith, the member clamping the annulus against the impeller independently of the spring.

3. In combination, a housing, a shaft projecting into the housing, an impeller secured to an end of the shaft in the housing and having radial and cylindrical portions forming with the shaft an annular recess surrounding the shaft, an annulus extending along the shaft into the recess in surrounding relation with the shaft and having an outwardly extending end engaging the said radial portion of the impeller, a member engaging the cylindrical portion of the impeller recess and clamping the outwardly extending end of the annulus against the radial portion of the impeller recess in sealing engagement therewith, a spring surrounding the annulus and acting between the member and the other end of the annulus to urge the said other end of the annulus against the housing in sliding sealing engagement therewith, the member functioning independently of the spring to clamp the outwardly extending end of the annulus against the impeller.

ALAN L. HIGBIE.

References Cited in the file of this patent

UNITED STATES PATENTS

| Number | Name | Date |
|---|---|---|
| 1,802,813 | Greenwald | Apr. 28, 1931 |
| 1,820,100 | Thompson | Aug. 25, 1931 |
| 1,931,723 | Fageol et al. | Oct. 24, 1933 |
| 1,945,825 | Saxe | Feb. 6, 1934 |
| 2,027,505 | Winkler | Jan. 14, 1936 |
| 2,044,957 | Strebler | June 23, 1936 |
| 2,167,986 | Lignian | Aug. 1, 1939 |
| 2,291,954 | Dupree | Aug. 4, 1942 |
| 2,395,095 | Brady | Feb. 19, 1946 |
| 2,408,909 | Brummer | Oct. 8, 1946 |
| 2,499,353 | Brummer | Mar. 7, 1950 |
| 2,512,749 | McCloskey | June 27, 1950 |

FOREIGN PATENTS

| Number | Country | Date |
|---|---|---|
| 516,263 | Germany | Jan. 21, 1931 |
| 566,441 | Great Britain | Dec. 29, 1944 |